Jan. 19, 1943.  S. W. ALDERFER  2,308,949
APPARATUS FOR MANUFACTURING CONTINUOUS RUBBER ARTICLES
Filed Aug. 26, 1938  5 Sheets-Sheet 1

INVENTOR
Sterling W. Alderfer
BY
Ely & Frye
ATTORNEYS

Jan. 19, 1943.  S. W. ALDERFER  2,308,949
APPARATUS FOR MANUFACTURING CONTINUOUS RUBBER ARTICLES
Filed Aug. 26, 1938  5 Sheets-Sheet 2

INVENTOR
Sterling W. Alderfer
BY
Ely & Frye
ATTORNEYS

Jan. 19, 1943.   S. W. ALDERFER   2,308,949
APPARATUS FOR MANUFACTURING CONTINUOUS RUBBER ARTICLES
Filed Aug. 26, 1938   5 Sheets-Sheet 3
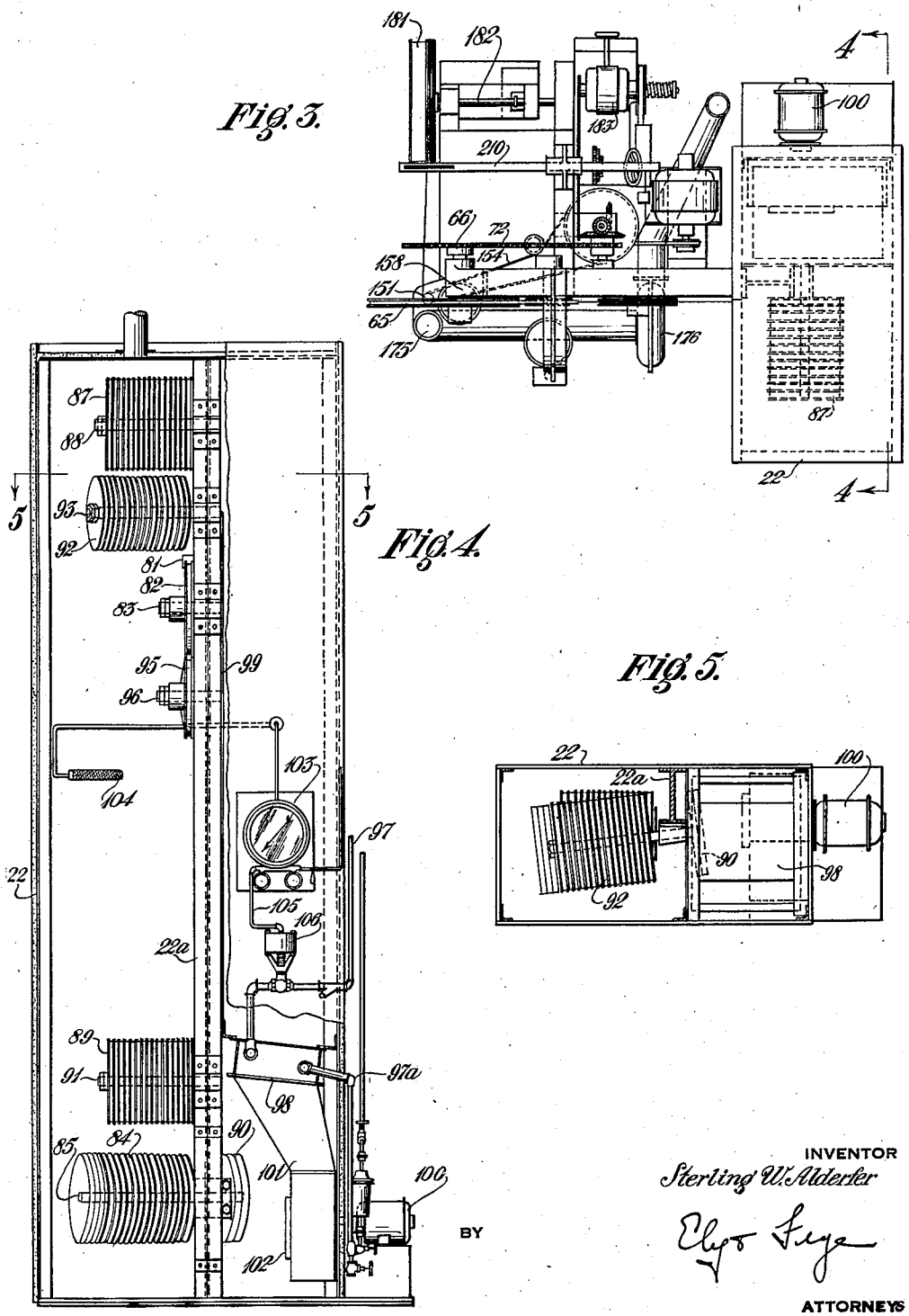
INVENTOR
Sterling W. Alderfer
BY
ATTORNEYS

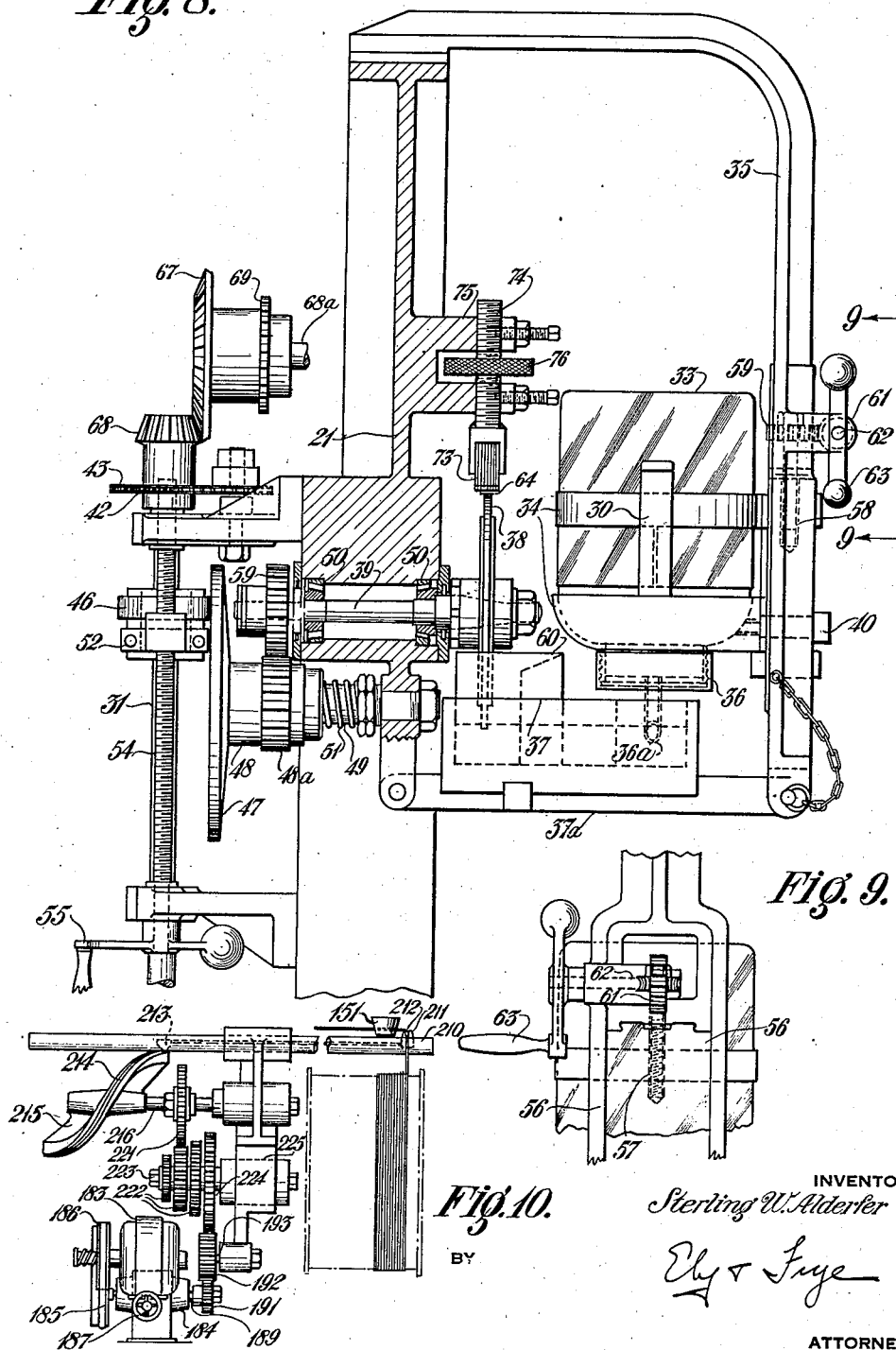

Patented Jan. 19, 1943

2,308,949

UNITED STATES PATENT OFFICE 2,308,949

APPARATUS FOR MANUFACTURING CONTINUOUS RUBBER ARTICLES

Sterling W. Alderfer, Fairlawn, Ohio, assignor to The Firestone Tire & Rubber Company, Akron, Ohio, a corporation of Ohio Application August 26, 1938, Serial No. 226,954

6 Claims. (Cl. 18—15)

This invention relates to apparatus for producing continuous rubber articles such as threads, tubing, strips, or the like, and has for its object the provision of novel apparatus for rapidly depositing a continuous film of latex on an endless belt; for preventing the deposited film of latex from fouling the machine; for producing an elongated rubber product from such latex film; for automatically dusting the final product; and for facilitating the continuous windup of the final product.

The foregoing and other objects will be made apparent by the following specification.

In the accompanying drawings:

Figure 3 is a plan view of Figure 1;

Figure 4 is a vertical cross section of the oven, partly in elevation, taken on line 4—4 of Figure 3, with the endless belt removed;

Figure 5 is a transverse cross section taken on line 5—5 of Figure 4;

Figure 7 is a transverse sectional view showing the construction of the gear train driving the thread forming pulleys;

Figure 8 is an elevation, partly in section, of the means for depositing latex on the endless belt;

Figure 9 is a detail elevation taken on line 9—9 of Figure 8; and

Figure 10 is an elevation of the level winding means of the invention.

The invention resides in a machine that is adapted to deposit latex continuously upon an endless metal belt and then form a rubber thread or other continuous product therefrom. The belt is run through a drying oven in which the belt is formed into convolutions to provide a maximum length of belt travel in a relatively small oven, the latex being converted into rubber coagulum in the oven. The belt is led from the oven and the rubber strip is pulled therefrom and drawn over a plurality of pulleys which progressively stretch the rubber strip. Next the stretched strip of rubber is rolled upon itself to form a solid rubber thread, when that is the desired product, after which a portion of the tension in the stretched rubber thread usually is removed, to reduce the per cent elongation of the rubber. Then the rubber thread is automatically dusted and wound on a drum. Means are associated with the endless belt for removing the strip of rubber coagulum to prevent fouling of the machine in case such rubber is not pulled therefrom by the pulleys in the customary manner. The amount of latex deposited upon the endless belt is made variable, so that a strip of rubber coagulum of the desired size may be formed by the apparatus of the invention.

Figure 1:
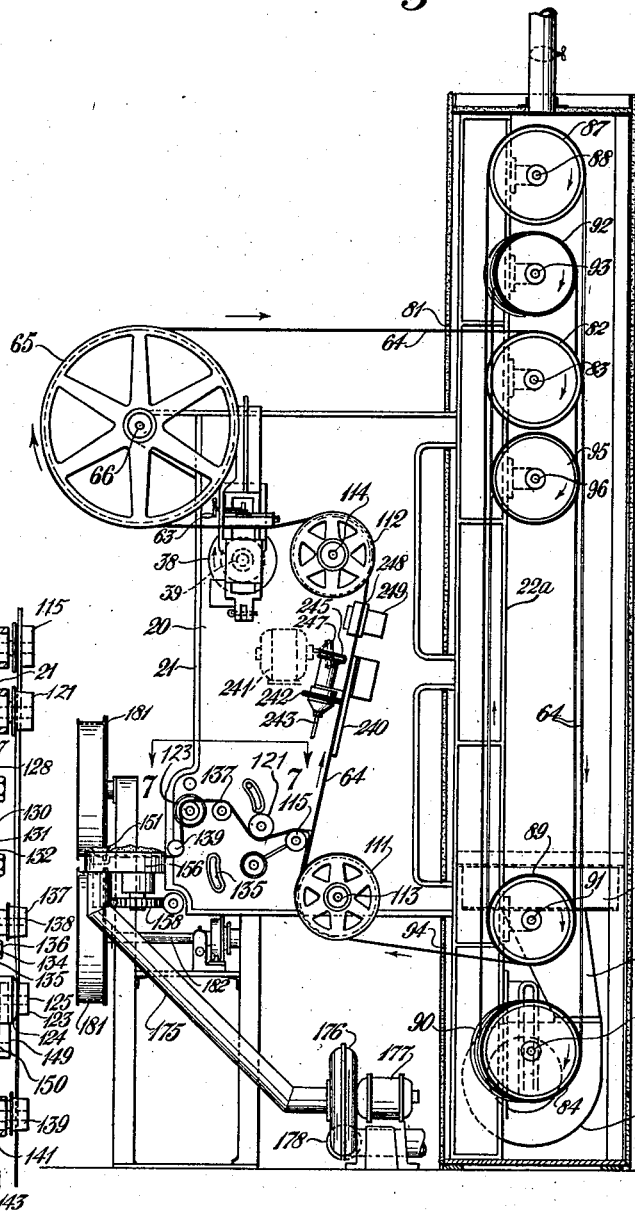
Figure 1 is an elevation of apparatus embodying the invention, with a side of the drying oven removed.
Figure 2:
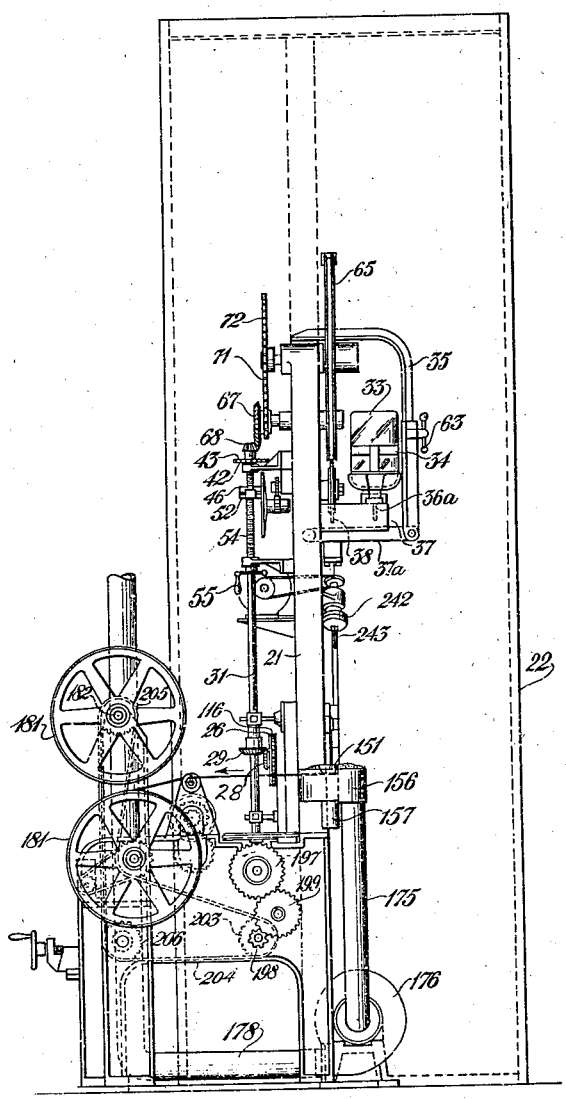
Figure 2 is a left side elevation of the apparatus of Figure 1.

Referring to the drawings, Figures 1 and 2 show the general layout of the thread making machine 20 which includes a main frame 21 and a suitably insulated drying oven 22.

Drive mechanism

Figure 6:
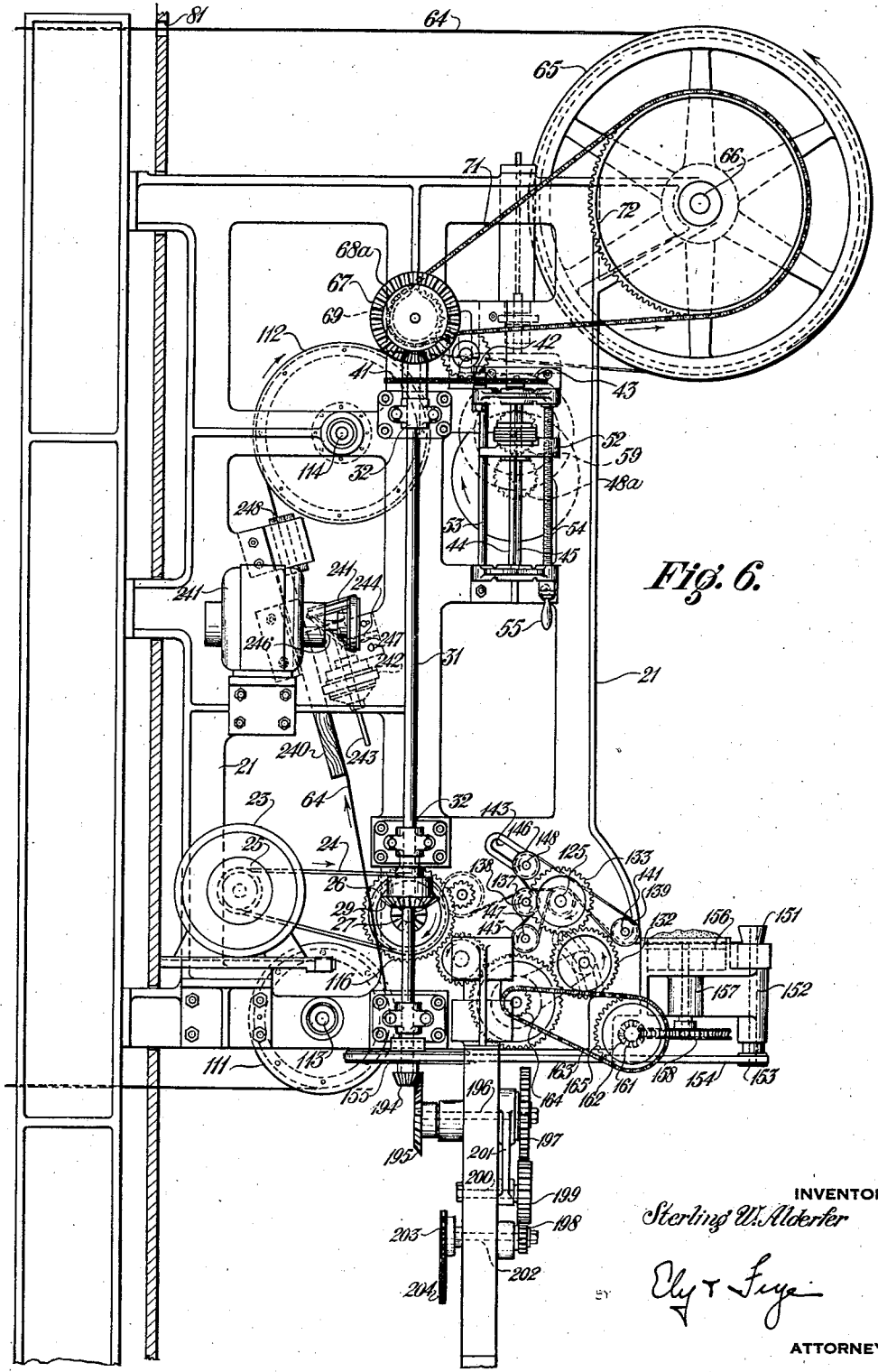
Figure 6 is a rear elevation of a portion of the apparatus of Figure 1 with the rear cover and level-wind mechanism removed.

The main driving mechanism for the machine 20 is shown in Figure 6 and it includes an electric motor 23 that is secured to the frame 21. A belt 24 is carried by a pulley 25 on the shaft of the motor 23 and it connects to a second pulley 26, upon a shaft 27 that is journalled upon the main frame 21 of the machine 20. The shaft 27 carries a bevelled gear 28 (Figure 7) that engages with a beveled gear 29 upon a jack shaft 31. The jack shaft 31, extending substantially the height of the machine, is journalled on frame 21 by housings 32 and provides power at the desired places in the machine as will hereinafter appear.

Rubber supply

A jar 33 is carried in an inverted position by a socket 34, having a handle 30 thereon, that is supported on an integral arm 35 of the frame 21 (Figure 8) by capscrews 40 which slidably engage with means carried by the arm 35. The jar 33 has a lid 36, having a tubular arm 36a, secured to it, the lid 36 and arm 36a extending downwardly through a hole in the socket 34 with the arm 36a projecting into a tank 37. The tank 37 is carried on an arm 37a that is pivotally secured between the frame 21 and the arm 35 of the frame. Latex from jar 33 flows down through the tubular arm 36a into the tank 37 until sufficient latex collects to cover the end of the arm, when flow automatically stops. Withdrawal of latex from the tank 37 sufficient to uncover the end of arm 36a automatically releases more latex so that a predetermined amount of latex can be maintained in the tank. The jar 33 and socket 34 can be slid upwardly to remove them from the machine.

A disc 38 is carried on a shaft 39 that is journalled in the frame 21 by bearings 50 and it is positioned with a portion of its peripheral surface extending into the tank 37. The disc is rotated by the jack shaft 31 which carries a sprocket 41 that engages with and drives a chain 42. This chain connects with a sprocket 43 upon a vertically extending shaft 44 (Figure 6), which is journalled on the main frame. The shaft 44 has a slot 45 cut therein and carries a cylindrical roller 46, which has a tongue thereon that engages with slot 45 to prevent relative movement between shaft 44 and roller 46. The roller 46 bears upon and drives a plate 47 formed integral with a cylindrical member 48 which extends axially from the plate. The member 48 and plate 47 are journalled on a shaft 49 which is carried by the frame 21 with a spring 51 on shaft 49 bearing on the member 48 to force the plate 47 against the roller 46 (Figure 8). The plate 47 drives the disc 38 through a gear 48a which is associated with the member 48 and which engages a gear 59 on the shaft 39.

To vary the speed at which the disc 38 is driven, the radial position of the roller 46 on the plate 47 is made variable by supporting the roller on a base member 52 that is mounted for vertical movement on rods 53 and 54 that are carried by the frame. The rod 54 is threaded and engages with a threaded hole through the base 52. A handle 55 is secured to one end of the rod 54, which is journalled on the frame 21, whereby the rod 54 may be rotated to change the vertical position of the base 52 and roller 46. The vertical movement of roller 46 is radial relative to the plate 47 (Figure 6).

The socket 34 is mounted for vertical movement on the arm 35 to control the position of the latex in tank 37 relative to the disc 38 by a block 56 that is slidably carried by the arm and that is provided with a threaded recess 57 (Figure 9) in its upper surface. The block 56 is supported by a threaded shaft 58 which engages with the threaded recess 57 and which is journalled on the arm 35. A spiral gear 59 is secured to the shaft 58 and it engages with a spiral gear 61 upon a shaft 62 that is journalled in arm 35 and that has a handle 63 secured to it at one end. Rotation of the shaft 62 by the handle 63 rotates gears 59 and 61 and thereby rotates the shaft 58 which is held against vertical movement so that its rotation produces vertical movement of the block 56 and of the jar 33. This varies its position relative to the tank 37, changes the depth of the latex therein, and controls the amount of latex that the disc 38 picks up in its rotation. A shield 60 may be placed in the tank 37 to prevent the disc from splashing latex.

An endless metal belt 64 is provided to receive the latex carried from the tank 37 by the disc 38. The belt 64 is carried by a sheave 65 (Figure 6) that is secured to a shaft 66 journalled in the frame 21. The jack shaft 31 drives the sheave 65 by means of a beveled gear 67 which mates with a beveled pinion 68 on the jack shaft. This gear 67 is carried by a shaft 68a that is journalled on frame 21 and which has an enlarged end portion that carries a sprocket 69. A chain 71 engages with the sprocket 69 and also with a relatively large sprocket 72 that is secured to the shaft 66, whereby a positive drive for the endless belt 64 is provided.

The position of the belt 64 relative to the disc 38 is controlled by a hardwood block 73 which is carried by one end of a threaded rod 74 and bears upon the back of the belt (Figure 8). This rod engages with threaded recesses in two spaced arms 75 protruding from the frame. A disc 76 engages with the rod 74 between the arms 75 so that rotation of the disc varies the position of the rod 74 and of the block 73 since the disc 76 is held against vertical movement by the arms. Obviously, the position of the belt 64 in relation to the disc is important to secure the desired continuous uniform deposit of latex on the belt. The belt does not bear upon the disc 38 but is spaced a small distance therefrom, which distance depends upon the latex composition, the belt and disc speed, and the amount of latex desired on the belt.

Figure 1 shows that the disc 38 rotates in a direction opposite to the direction of movement of the belt 64. This rotation of the disc 38 facilitates the continuous deposition of latex on the belt and is one of the features of the invention.

*Drying oven*

The endless belt 64, carrying the film deposited thereon by the disk 38, is drawn directly from the sheave 65 into the drying oven 22 through a small opening 81 in the side of the oven. The belt passes over a sheave 82 which is mounted in the oven adjacent the center support 22a thereof on a journalled shaft 83. In order to provide a long length of belt travel in the oven, a plurality of pulleys are carried by shafts in the oven at the top and bottom thereof with certain pulleys, or sheaves being larger than others to provide apparatus for forming two sets of concentric convolutions of the belt 64 in the oven. Thus, the belt 64 is drawn from the sheave 82 to an aligned end sheave of a plurality of sheaves 84 that are carried upon a single shaft 85 at the base of the oven. The shaft 85 positions the sheave 84 at a slight angle to the plane of the oven 22, so that the belt 64 in being drawn over one of the sheaves 84 has its transverse position in the oven 22 moved approximately the width of one sheave. From the first sheave 84 that it contacts, the belt 64 is led to the corresponding aligned sheave of a plurality of sheaves 87, all of which are carried by a shaft 88, suitably journalled in the frame adjacent the top of the oven. The sheave 87 directly above the sheave 82 is only used for spacing purposes in the present construction. Then the belt 64 is led from the sheave 87 which it contacts to the aligned member of the sheaves 84 which moves the belt transversely and aligns it with a second sheave of the sheaves 87. This is repeated until the belt 64 has been drawn around all of these sheaves.

From the end member of the sheaves 87, the belt is led to an aligned member of a plurality of sheaves 89 that are carried by a shaft 91 that is journalled on the center support 22a adjacent the bottom of the oven but which is above and substantially aligned with the shaft 83. The belt then passes to the aligned sheave of a plurality of sheaves 92 that are secured to a shaft 93 which is journalled in the oven 22 adjacent the top thereof, but underneath the shaft 88. The adjacent sheaves may be spaced by discs, if desired. Figure 4 shows that the shaft 93 mounts the sheaves 92 at a slight angle to the sheaves 89 to provide transverse movement of the belt 64 to align it with the next member of the sheaves 89. The belt is drawn around the sets of sheaves 89 and 92 until all of the sheaves 89 have been utilized, and then the belt is drawn from the oven 22 through a small opening 94 in the side of the oven. In the last convolution of the belt in the oven, the belt is drawn over a sheave 95 which is journalled on a shaft 96 that is aligned with and below the sheave 82. This is necessary, since the sheave 82 is directly in the path of the loop of belt formed around last sheave 89. Figure 1 illustrates how the plurality of convolutions of the belt are formed in the oven by making the sheaves 82, 84, and 87, larger than the sheaves 89, 92, and 95, whereby the first set of convolutions is formed around the larger sheaves and the second series of convolutions is formed inside the first.

The desired tension is maintained upon the belt 64 by hanging the shaft 85 and sheaves 84 in the belt's convolutions with weights 90 being placed on the shaft 85 to aid in tensioning the belt. The shaft 85 is therefor only positioned by the center support 22a and permitted to move vertically relative thereto.

Any latex carried upon the belt 64 in its travel through the oven 22 must be formed into a rubber coagulum, and any suitable means for supplying heat to the oven 22 are provided for this purpose. In the embodiment illustrated, steam heat is used and this is provided through a pipe 97 which provides steam to a radiator 98 which is in the flue formed in the oven by a baffle plate 99. Steam is exhausted from the radiator through pipe 97a which has a water trap therein. Air is circulated through the oven 22 by a blower 100 which connects to the radiator 98 by a conduit 101. The blower draws air through a door 102 in the conduit and forces it through the radiator and up into the flue formed by the baffle plate 99. Then the air is forced down through and around the convolutions of the belt 64 and finally is drawn back into the conduit 101.

Control means, which may include a temperature control and recorder 103, are provided to regulate the flow of the steam through the radiator. The recorder 103 is of standard construction and includes a temperature sensitive member 104 which is positioned in the oven 22. The recorder controls the air pressure in a pipe 105, which connects to an air valve 106. This valve is connected in the steam pipe 97, so that variations in pressure in the pipe 105 control the setting of the valve 106 and thereby the steam flow through the radiator and temperature of the oven 22. Usually the latex should only be dried into a flat rubber strip in the oven and not be vulcanized appreciably while therein, the temperature of the oven and the speed of the belt being regulated to achieve this purpose.

*Rubber thread formation*

The belt 64, carrying the strip of rubber coagulum, is drawn over a sheave 111 when it emerges from the oven 22 and then it passes over a sheave 112, adjacent the top of the frame 21, prior to completing its circuit i. e. passing under the hardwood block 73 adjacent the disc 38. The sheaves 111 and 112 are secured to shafts 113 and 114, respectively, that are suitably journalled on the frame 21.

The strip of rubber on the belt 64 is drawn therefrom by a pulley 115 which is secured to the shaft 27 that is driven by the motor 23. The pulley 26 has a gear 116 formed integrally therewith which engages with a gear 117 on a shaft 118 which is journalled in the frame by bearings 119 and which carries a pulley 121 in alignment with the pulley 115. Thus pulley 121 is positively driven and the speeds of the pulleys 115 and 121, for example, are made such that they progressively stretch the rubber strip to approximately 500% elongation in drawing it from the belt 64.

A pulley 123, having a frusto-conical flange 124, is secured to a shaft 125 which is mounted on bearings 126 in frame 21. The pulley 123 is positioned so that the flange 124 bears upon one edge of the flat rubber strip drawn from the belt 64 and rolls it laterally upon itself in the manner described in my Patent No. 2,070,388 issued February 9, 1937. The pulley 123 desirably is driven at a controllable speed from the main drive of the machine to vary the tension, or elongation, of the rubber for different products and its speed usually is slightly greater than the speed of the pulley 121. Thus the gear 116 also engages with a gear 127 which is journalled upon a shaft 128 that is carried by the frame 21. This gear 127 drives a gear 129 which is mounted on a shaft 131 that is journalled by bearings 132 in a sleeve 130 secured in the frame (Figure 7). The shaft 125 is positively driven by the gear 129 through a gear 132 which engages with a gear 133 on shaft 125. The gear 132 is rotatively carried by a shaft 134 that is secured in an arcuate slot 135 in the frame. An arm 140 is rotatively carried by the sleeve 130 to engage with and aid in positioning the shaft 134. The shaft 134 has nuts 136 engaged with its ends which, when loosened, permit arcuate movement of the shaft 134 relative to the shaft 131. This varies the distance between the shaft 134 and the gears 129 and 133, whereby varying sized gears may be inserted therebetween to vary the speed of the pulley 123 and thus the tension in the rubber strip drawn thereover.

A pulley 137 is secured to a shaft 138 that is journalled in the frame 21; the pulley 137 being adjacent and in substantial alignment with the pulley 121 (Figure 1). The rubber strip is led over the upper surface of the pulley 137 from the lower surface of the pulley 121 to position it for the pulley 123. From the pulley 123 the elongated rubber strip, now in thread form, is led around a pulley 139 on a shaft 141 which is journalled in the frame 21 to position the thread for its next treatment. All of the pulleys 115, 121, 123, 137 and 139 are carried on their shafts adjacent one of the ends thereof and they have flanges on the edge of the pulley adjacent the frame to prevent the rubber strip from being wound between the pulleys and the frame.

The pulleys 137 and 139 are driven by the shaft 125 and ordinarily at the same speed as the pulley 123. The shafts 125, 138, and 141 all carry double flanged pulleys 142 adjacent the ends thereof extending from the frame 21, the pulleys 142 being remote from the rubber carrying pulleys. The pulleys 142 carry a belt 144 that also passes over pulleys 145 and 146 which are journalled on shafts 147 and 148 that are carried by the frame. This permits the belt 144 to drive the pulleys 137 and 139 in the desired direction. Shaft 148 is adjustably received in a slot 143 in the frame, whereby its position can be varied to control the tension in the belt 144.

While the pulley 123 is carried and driven by the shaft 125, its position relative to the frame 21 is controlled by a yoke 149 with which the pulley is rotatively associated. The yoke is carried by a rod 150 which is slidably received in the frame and which engages with an adjusting nut 150a. This nut is retained in fixed relation to the frame by a locking arm 150b whereby rotation of the nut varies the position of the rod 150 and thereby that of the pulley 123 relative to the frame. Thus the position of the flange 124 with relation to the other pulleys and to the belt can be changed whereby the amount of rolling action exerted upon the rubber tape can be varied, as desired.

Dusting apparatus

After passing over the pulley 139, the rubber thread passes around a horizontally positioned pulley 151 (Figure 6) which is carried by the upper end of a shaft 152 that is rotatively associated with the frame 21. The pulley 151 is beveled inwardly from its upper to its lower edge to force the thread to remain at the lowest portion thereof. The lower end of the shaft 152 extends from the frame 21 and carries a pulley 153 which has a belt 154 engaged therewith. The belt 154 also engages with a pulley 155 that is secured to the jack shaft 31 which thereby drives the pulley 151. The apparatus preferably is constructed so that the pulley 151 is driven at substantially the peripheral speed of the pulley 123.

The rubber thread passes across a circular table 156 in reaching the pulley 151 from pulley 139. A suitable dusting material, such as soapstone, is piled upon the table in the path of the thread to deposit upon the thread and permit it to be wound upon itself without adhesion. The table 156 is carried by a vertically extending shaft 157 which is journalled in the frame 21 and which has a worm wheel 158 secured to its lower end. The worm wheel is driven by a worm gear 161 which is carried by a shaft 162 journalled on the frame. The driven shaft 131 drives the shaft 162 by a chain 163 which engages sprockets 164 and 165 on the shafts 131 and 162 respectively. Thus the table 156 is slowly rotated whereby the rubber thread automatically is continually cutting a new path through the dusting material, which is supplied to the table 156 in any suitable manner.

Excess dusting material upon the rubber thread is drawn therefrom by an exhaust flue 175 which is adjacent the path of the thread. The flue 175 connects to a centrifugal pump 176 that is driven by a motor 177 and that produces a suction in the flue 175. An output flue 178 is provided to dispose of the exhausted material.

Windup apparatus

Two cylindrical drums 181 are removably carried by shafts 182 that are journalled in the frame 21. The drums 181 (Figure 2) are vertically aligned and are positioned so that their adjacent edges are substantially in horizontal alignment with the rubber thread as it is drawn from the pulley 151. Two drums are provided so that the thread may be immediately started upon one drum after the other has the desired amount of thread thereon, thus permitting removal and insertion of drums, as desired. The drums are readily placed on or removed from their shafts while the shafts are rotating although clutch mechanisms may be associated with the shafts 182 to facilitate the drum changing. The jack shaft 31 drives the drums 181 through a beveled pinion gear 194 at the lower end thereof which engages with a beveled gear 195 carried by a shaft 196 (Figure 6). This shaft is journalled in the frame 21 and carries a second gear 197 that drives a gear 198 through gear 199. The gear 199 is journalled upon a shaft 200 that is secured in an arcuate slot in the frame so that the relative position of the shaft 200 and the gear 197 can be varied to change the windup speed of the drums 181 by inserting varying sized gears between the gears 197 and 198. Usually the drums have a slower peripheral speed than the pulley 123. An arm 201 may be carried by the shaft 196 and engage with the shaft 200 to aid in positioning it. A journalled shaft 202 mounts the gear 198 on the frame 21 and carries a sprocket 203. This sprocket engages with a chain 204 that engages with sprockets 205 on the shafts 182 carrying the drums 181. An auxiliary sprocket 206, carried by a shaft journalled in the frame, engages with the chain 204, as shown, (Figure 2) so that the drums 181 are driven in the desired opposite directions.

Standard level winding means are provided to wind the thread upon the drums 181. These means include an arm 210 (Figure 10) which is slidably supported by the frame 21 and which carries at one end a guide 211, having a groove 212 in its upper surface. The other end of the arm 210 carries a pin 213 which engages with a groove 214 in the periphery of a circular, substantially S shaped in section, cam plate 215. On rotation, the cam plate 215 is adapted to move the arm 210 and thereby the guide 211 back and forth over a predetermined length horizontal path. Naturally, the guide 211 is positioned in the normal course of the rubber thread between the pulley 151 and the drums 181 and it receives the thread in the groove 212. Cam plate 215 is secured to a shaft 216 that is journalled in the frame 21. This shaft also carries a gear 221 which engages with any one of a set of gears 222 by varying its position on the shaft 216. The gears 222 are carried by a shaft 223 that is journalled in the frame 21 and which carries still another gear 224. The shaft 223 is received in a slot 225 in the frame, whereby its position relative to the gear 221 may be changed to permit different gears of the set 222 to mate with the gear 221. The shaft 223 and thereby the level wind mechanism is driven by a suitable electric motor 183 that is mounted on the frame 21 and that is connected to a speed reducer 184 by a belt 185. The motor is provided with a standard speed control that includes a sheave 186 which can vary its effective radius. The motor 183 is slidably mounted upon the frame 21 so that its position relative to the speed reducer 184 and the actual revolutionary speed transmitted to the reducer may be varied. The position of the motor 183 is controlled by a hand wheel 187 which controls a threaded rod that engages with the base of the motor 183. The slow-speed side of the speed reducer 184 comprises a shaft 189 which carries a gear 191. This gear engages with and drives a gear 192 that is journalled on a shaft 193 secured to the frame 21, which gear 192 in turn engages with and drives the gear 224.

Belt cleaning mechanism

A suitable electric motor 241 (Figure 6) is secured to the frame 21 adjacent the path of the endless belt 64 at a point in the belt's path at which the strip of rubber coagulum normally is removed from the belt. A circular brush, or buffer 242, which is made from any suitable material, is mounted upon a shaft 243 that is journalled in a bracket 244 of the frame 21. A hardwood block 246 is carried by the frame in the path of the belt 64 to force it to contact the brush 242. The shaft 243 carries a pulley 245 at its upper end and the lower end of the shaft extends several inches beyond the brush 242 towards the point at which the rubber strip normally is pulled from the belt. A belt 246 extends between the pulley 245 and a pulley 247 on the shaft of the motor 241 to rotate the brush 242 and the shaft 243. Rotation of the brush serves to clean off any small particles of rubber coagulum on the belt and, if the strip of rubber is not removed from the belt in the ordinary manner, the brush 242 also sweeps such coagulum off the belt. This lengthy rubber strip then is rapidly wound upon the protruding end of the shaft 243 by the rotation thereof and, when desired, can be readily removed therefrom. By collecting the rubber on the shaft 243, it is prevented from fouling the apparatus in any manner. This novel cleaning device completely removes all rubber from the belt 64 regardless of the rapidity of movement thereof.

The belt 64 may be drawn by a cleaning block 248, which is secured to the frame 21 by a holder 249, after passing the brush 242. The hardwood block 240 also may force the belt against the block 248, as shown. The cleaning block may be made of any desired material to clean the tape further prior to depositing more latex thereon and may even comprise a wick which is continuously supplied with water.

*Operation*

In operation, a continuous wet film of latex is deposited on the endless belt 64 as it is drawn by the rotating disc 38. This wet latex is dried into a rubber film in the oven 22, which endless strip of rubber is pulled from the belt 64 after it leaves the oven by pulleys 115 and 121 which progressively stretch the rubber strip. The tensioned rubber strip is laterally rolled upon itself to form a rubber thread, or tube and then drawn through the dusting material carried by table 156 after which the thread is led to the wind-up drums 181 and distributed evenly thereover, under tension if desired, by the level winding mechanism provided. To prepare the endless belt for receiving another film of latex, the circular brush 242 and cleaning block 248 function to remove all foreign material upon the endless belt 64. The clean belt is then drawn by the disc 38 and the process repeated whereby a continuous rubber thread is produced by the machine.

The word "latex" in the specification and claims is intended to mean any natural or artificial dispersion of rubber, which may be either vulcanized or unvulcanized, as desired.

By varying the functioning of the pulley 123, it should be noted that a rubber tube can be produced while omission of that pulley causes the machine to yield a product of rubber tape.

Obviously the speeds of the various pulleys and windup drums may be varied in accordance with the product desired.

In accordance with the patent statutes, I have illustrated and described the structure and mode of operation of an embodiment of the invention. However, it will be understood that various modifications can be made without departing from the scope of the invention as defined in the appended claims.

What is claimed is:

1. Apparatus for producing continuous rubber articles, such as threads, strips, tubes, or the like, comprising a frame, a motor associated with said frame, a jack shaft journalled on said frame and being rotatably driven by said motor, an endless belt, means positioning a portion of said belt for movement along a portion of said frame, means connecting said jack shaft to said belt to drive it, a tank supported by said frame, means for maintaining latex in said tank at a predetermined level, a cylindrical disc mounted with a portion of its periphery extending into the latex in said tank and being positioned immediately adjacent a portion of said belt, variable speed drive means connecting said disc to said jack shaft to rotate said disc, rotation of said disc depositing a continuous film of latex upon said belt, means for varying the level of the latex in said tank whereby the amount of latex deposited upon said belt can be controlled, a drying oven positioned adjacent said frame and receiving said belt after latex is deposited thereon by said disc, a plurality of sheaves journalled in the top and bottom of said drying oven and engaging with said belt to dry the latex on said belt in strip form as it is drawn through said oven, means leading said belt back to said frame from said oven, a plurality of pulleys journalled on said frame and being driven from said jack shaft, said pulleys pulling the strip of rubber from said belt and progressively stretching the rubber strip, and a wind-up drum for collecting said rubber strip.

2. Apparatus for producing continuous rubber articles, such as threads, strips, tubes, or the like, comprising a frame, an endless belt, means for driving said belt, means mounting said belt for movement along a portion of said frame, means for depositing a continuous film of latex upon said belt as it is drawn by said frame, a drying oven, means positioning said belt in a plurality of convolutions in said oven to dry the latex thereon as said belt is drawn therethrough, means leading said belt back to said frame to complete its circuit, means for pulling said rubber strip from said belt and progressively stretching it, means bearing upon said belt after said rubber strip normally is removed therefrom and rotating at right angles thereto to clean said belt, means through which said rubber strip is drawn for continuously applying a dusting material thereto, and a plurality of wind-up means for said rubber strip whereby one of said wind-up means can be changed while said rubber strip is being collected by another of said wind-up means.

3. Apparatus for producing continuous rubber articles, such as threads, strips, tubes, or the like, comprising a frame, an endless belt, means for driving said belt, means mounting said belt for movement along a portion of said frame, means for depositing a film of latex upon said belt as it is drawn by said frame means for varying the amount of latex deposited upon said belt, means for drying the latex into a rubber strip, means for pulling said rubber strip from said belt and stretching it, means for automatically applying a dusting material to said rubber strip, means for exhausting excess dusting material from said rubber strip, and wind-up means for collecting said rubber strip, said wind-up means having level wind means associated therewith to deposit said rubber strip evenly thereover.

4. Apparatus for producing continuous rubber articles, said apparatus comprising a frame, a motor associated with said frame, a jack shaft journalled on said frame and being rotatably driven by said motor, an endless belt associated with said frame and driven by said motor through said jack shaft, a tank supported by said frame, means for maintaining latex in said tank at a predetermined level, a cylindrical disc mounted with a portion of its periphery extending into the latex in said tank and with another portion of its periphery immediately adjacent a portion of said belt, means for varying the level of the latex in said tank, variable speed drive means connecting said disc to said jack shaft to rotate said disc oppositely to the movement of said belt to deposit a continuous even film of latex upon said belt, a drying oven positioned adjacent said frame through which said belt passes after latex is deposited thereon by said disc to dry the latex to form a rubber strip, a plurality of pulleys journalled on said frame and being driven by said jack shaft, said pulleys pulling the strip of rubber from said belt after it passes through said drying oven and progressively stretching the rubber strip, a flanged pulley carried by said frame and positively driven by said jack shaft to roll the rubber strip laterally upon itself, a member adapted to carry dusting material journalled on said frame and rotated by said jack shaft, means leading said rolled rubber strip over said member to pass the said strip through said dusting material which constantly has a new path cut therethrough, and means for removing excess dusting material from said rolled rubber strip.

5. Apparatus for manufacturing continuous rubber articles, such as threads, strips, tubes, or the like, comprising an endless moving belt, means for depositing a film of latex on said belt, means for drying the latex into a rubber strip, means for pulling said rubber strip from said belt, a substantially circular brush mounted to bear upon said belt at a position at which there normally is no rubber thereon, means for rotating said brush against and across said belt, and a shaft member rotating with said brush and extending out substantially axially from said brush towards the approaching portion of said belt whereby said belt is kept clean by said brush sweeping off any rubber on said belt which rubber, when of appreciable length, is collected upon said shaft member by the rotation thereof.

6. Apparatus for manufacturing continuous rubber articles, such as threads, strips, tubes, or the like, comprising an endless moving belt, means for depositing a film of latex on said belt, means for drying the latex into a rubber strip, means for pulling said rubber strip from said belt, a flat horizontal rotating member adapted to carry dusting material, means leading said rubber strip over said horizontal member to pass the said strip through said dusting material which constantly has a new path cut therethrough, and means for pulling off excess dusting material from said strip.

STERLING W. ALDERFER.